US010571971B2

(12) United States Patent
Tsai et al.

(10) Patent No.: US 10,571,971 B2
(45) Date of Patent: Feb. 25, 2020

(54) DEVICE STANDS HAVING SIDEWALLS WITH DIFFERENT SLOPES

(71) Applicant: Hewlett-Packard Development Company, L.P., Houston, TX (US)

(72) Inventors: Ming-Shan Tsai, Taipei (TW); Szu-Yu Chen, Taipei (TW); Wei-Chih Tsao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/763,026

(22) PCT Filed: Jan. 27, 2016

(86) PCT No.: PCT/US2016/015020
§ 371 (c)(1),
(2) Date: Mar. 23, 2018

(87) PCT Pub. No.: WO2017/131646
PCT Pub. Date: Aug. 3, 2017

(65) Prior Publication Data
US 2019/0056763 A1    Feb. 21, 2019

(51) Int. Cl.
*G06F 1/16* (2006.01)
(52) U.S. Cl.
CPC ............ *G06F 1/166* (2013.01); *G06F 1/1626* (2013.01); *G06F 1/1632* (2013.01)
(58) Field of Classification Search
CPC ...... G06F 1/1626; G06F 1/1632; G06F 1/168; G06F 1/1656; G06F 1/166
See application file for complete search history.

(56) References Cited

U.S. PATENT DOCUMENTS

| 2004/0011938 A1* | 1/2004 | Oddsen, Jr. ............ F16M 11/10 |
| | | 248/393 |
| 2010/0059649 A1 | 3/2010 | Buxton |

(Continued)

FOREIGN PATENT DOCUMENTS

| CN | 202791879 U | 3/2013 |
| KR | 10-2011-0064735 A | 6/2011 |

(Continued)

OTHER PUBLICATIONS

Gadgetmac, "Facet Magnetic Ipad / Ipad Mini Stand Review", Mar. 2013, Available at: http://gadgetmac.com/reviews/facet-magnetic-ipad-ipad-mini-stand-review.html.

(Continued)

*Primary Examiner* — Jinhee J Lee
*Assistant Examiner* — Ingrid D Wright
(74) *Attorney, Agent, or Firm* — HP Inc. Patent Department

(57) ABSTRACT

Example implementations relate to establishing communication links with computing devices. As an example, a device stand includes a first member including an attachment feature to couple the device stand to a computing device. The device stand also includes a second member including a rotation track to enable the first member to rotate with respect to the second member to decouple the device stand from the device. The device stand further includes a third member including an opening to receive the attachment feature. The second member is situated between the first member and the third member. The device stand further includes a first sidewall having a first slope and a second sidewall having a second slope that is different from the first slope. The first sidewall and the second sidewall are defined by the first member and the second member.

14 Claims, 4 Drawing Sheets

(56) References Cited

U.S. PATENT DOCUMENTS

| | | |
|---|---|---|
| 2013/0027859 A1 | 1/2013 | Hyun et al. |
| 2013/0106353 A1* | 5/2013 | Foster .................. H02J 7/0044 |
| | | 320/114 |
| 2013/0187020 A1* | 7/2013 | Trotsky .................. F16M 11/10 |
| | | 248/309.3 |
| 2013/0342159 A1 | 12/2013 | Paschke et al. |
| 2014/0036430 A1 | 2/2014 | Wroblewski et al. |

FOREIGN PATENT DOCUMENTS

| | | |
|---|---|---|
| WO | WO-2013141447 A1 | 9/2013 |
| WO | WO-2014209343 A1 | 12/2014 |

OTHER PUBLICATIONS

Gadgetsin, "Flux+Flap iPad Case with Magnetic Stand for Unlimited Angles", Nov. 2013, Available at: http://gadgetsin.com/fluxflap-ipad-case-with-magnetic-stand-for-unlimited-angles.htm.

\* cited by examiner

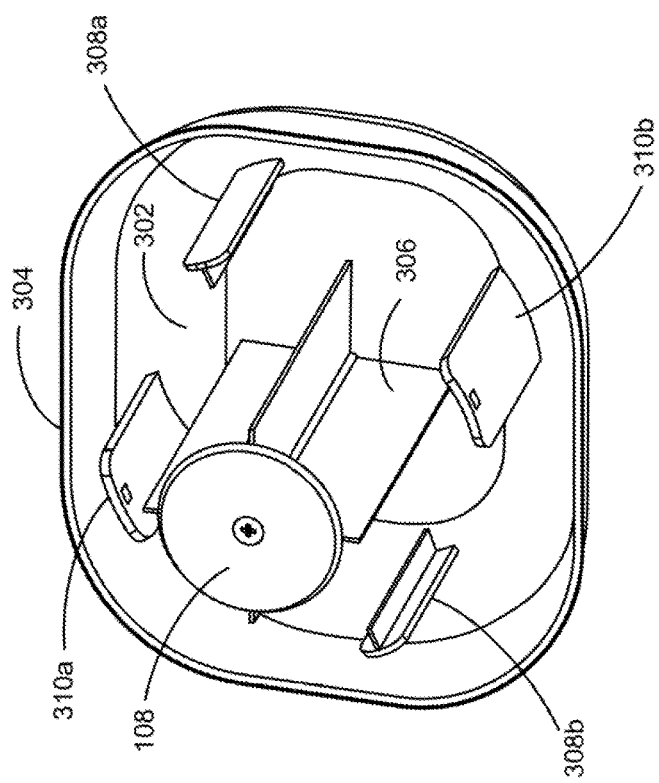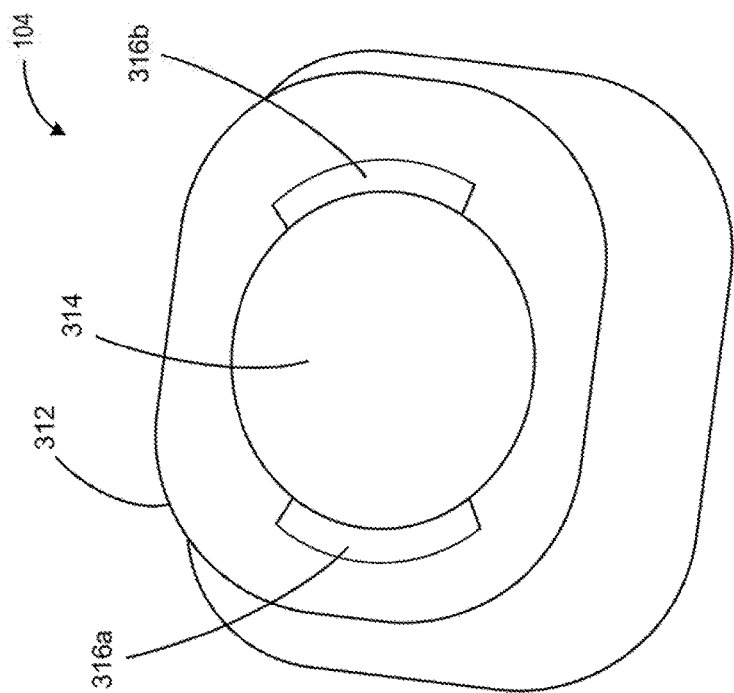
FIG. 3A
FIG. 3B

DEVICE STANDS HAVING SIDEWALLS WITH DIFFERENT SLOPES

BACKGROUND

Some computing devices include an integrated display to achieve a smaller foot print as compared to a computing device coupled to a separate display. For example, a tablet computer has an integrated display. As another example, an All-in-One computer has an integrated display.

BRIEF DESCRIPTION OF THE DRAWINGS

Some examples of the present application are described with respect to the following figures:

FIG. 3A illustrates a perspective view of a first member of the device stand of FIG. 1A, according to an example;

FIG. 3B illustrates a perspective view of a second member of the device stand of FIG. 1A, according to an example.

DETAILED DESCRIPTION

A computing device with an integrated display may include a stationary stand so that the computing device can be used in a vertical orientation without a user physically holding the computing device. However, a stationary stand may provide limited orientation adjustments, such as reclining angles. Thus, ease of use of the computing device may be reduced.

Examples described herein provide a device stand having sidewalls with different slopes to enable an electronic device to be placed in multiple orientations. For example, a device stand may include a first member including an attachment feature to couple the device stand to a computing device. The device stand may also include a second member including a rotation track to enable the first member to rotate with respect to the second member to decouple the device stand from the device. The device stand may further include a third member including an opening to receive the attachment feature. The second member may be situated between the first member and the third member. The device stand may further include a first sidewall having a first slope and a second sidewall having a second slope that is different from the first slope. The first sidewall and the second sidewall may be defined by the first member and the second member. The different sidewalls of the device stand may define different reclining angles of the computing device. Thus, ease of use of the computing device may be increased.

Figure 1A:
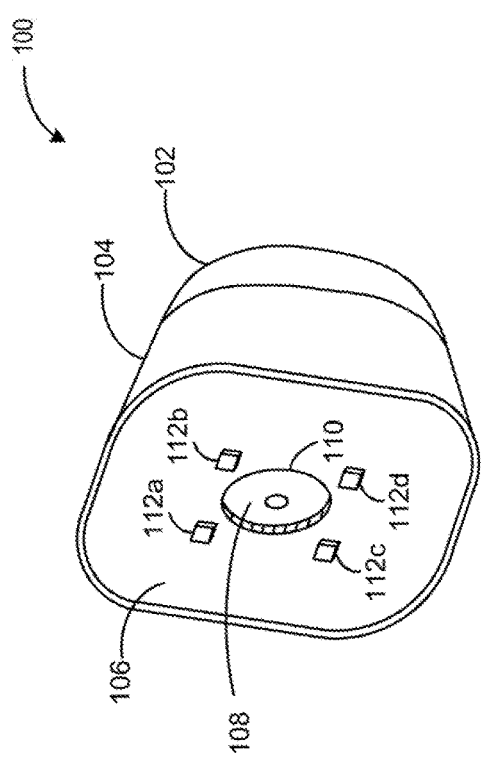
FIG. 1A illustrates a perspective view of a device stand having sidewalls with different slopes, according to an example.
Figure 1C:
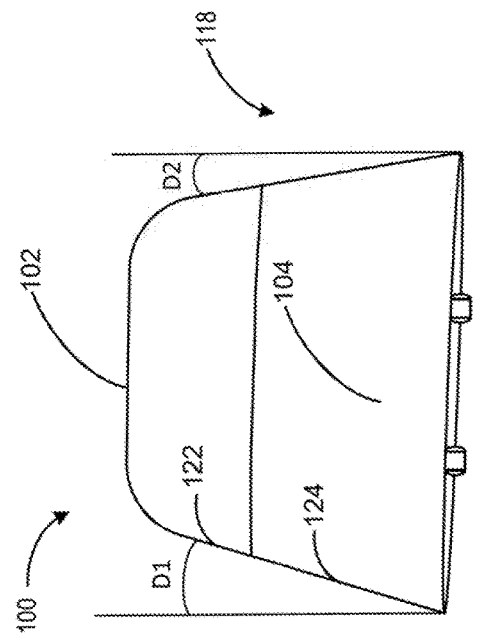
FIG. 1C illustrates a side view of the device stand of FIG. 1A, according to an example.
Figure 1B:
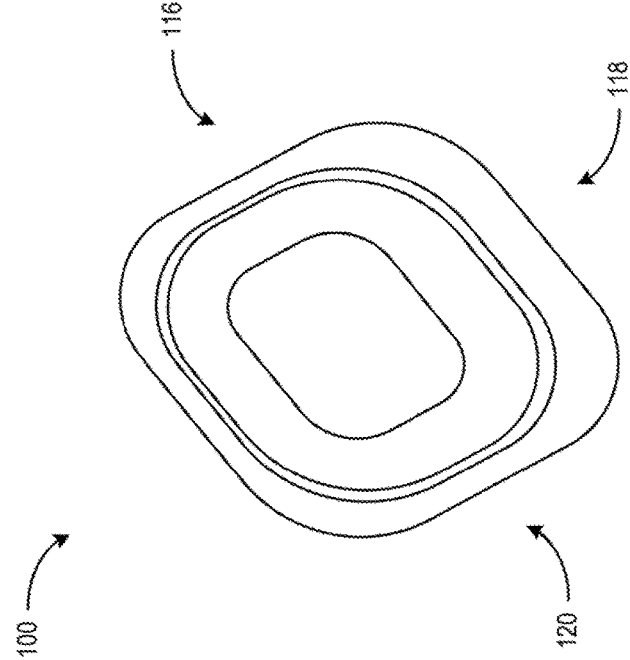
FIG. 1B illustrates a top view of the device stand of FIG. 1A, according to an example.

FIGS. 1A-1C illustrate different views of a device stand 100 having sidewalls with different slopes. FIG. 1A illustrates a perspective view of device stand 100. FIG. 1B illustrates a top view of device stand 100. FIG. 1C illustrates a side view of device stand 100.

Turning to FIG. 1A, device stand 100 may include a first member 102, a second member 104, a third member 106, and an attachment feature 108. First member 102 and second member 104 are described in more detail in FIGS. 2A-2B. Second member 104 may be situated between first member 102 and third member 106. Third member 106 may be encompassed by second member 104.

Attachment feature 108 may be a device or a structure to couple device stand 100 to a computing device. In an example, attachment feature 108 may be a magnet. Third member 106 may include a first opening 110 to receive attachment feature 108. Third member 106 may also include a set of mounting tabs 112a-112d. As described in more detail in FIG. 2A, the set of mounting tabs 112a-112d may be plugged into a set of mounting holes of a computing device so that device stand 100 may adjust an orientation of the computing device by defining a reclining angle of the computing device.

Turning to FIG. 1B, device stand 100 may include a plurality of sidewalls 114-120. Each sidewall 114-120 may be define by distinct regions of first member 102 and second member 104. In some examples, each sidewall 114-120 may have a distinct slope. For example, a first sidewall 114 may have a first slope. A second sidewall 116 may have a second slope different from the first slope. A third sidewall 118 may have a third slope different from the second slope. A fourth sidewall 120 may have a fourth slope different from the third slope. When device stand 100 is coupled to a computing device, each sidewall 114-120 may define a different reclining angle of the computing device. Thus, device stand 100 may enable multiple orientation adjustments for the computing device. In some examples, a first subset of sidewalls of device stand 100 may have the first slope and a second subset of sidewalls of device stand 100 may have the second slope. For example, sidewalls 114 and 118 may have the first slope while sidewalls 116 and 120 may have the second slope. An example of the different slopes is described in more detail in FIG. 1C. As another example, sidewalls 114 and 116 may have the first slope while sidewalls 118 and 120 may have the second slope.

Turning to FIG. 1C, first sidewall 114 may be defined by a first region 122 of first member 102 and a first region 124 of second member 104. Third sidewall 18 may be defined by a second region 126 of first member 102 and a second region 128 of second member 104. As shown in FIG. 1C, first sidewall 114 may have a draft angle D1 of 19 degrees defined by the first slope. Third sidewall 118 may have a draft angle D2 of 13 degrees defined by the third slope. Thus, depending on the orientation of device stand 100 relative to a computing device that device stand 100 is coupled to, the reclining angle of the computing device may be defined. Using device stand 100 to define different reclining angles to a computing device is described in more details in FIGS. 2A-2D.

Figure 2A:
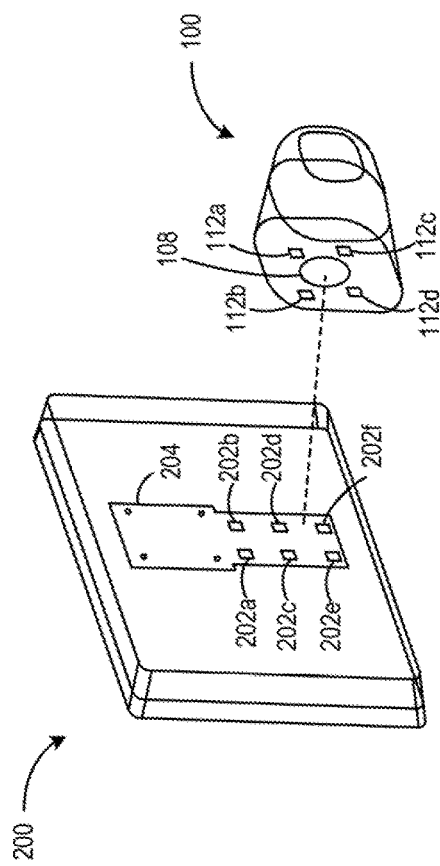
FIG. 2A illustrates a perspective view of the device stand of FIG. 1A coupled to a computing device to define different reclining angles of the computing device, according to an example.

FIG. 2A illustrates a perspective view of device stand 100 of FIG. 1A coupled to a computing device 200 to define different reclining angles of computing device 200, according to an example. Computing device 200 may be, for example, an All-in-One (AiO) computer, a tablet computer, a smart phone, or any portable electronic device that utilizes a stand. Computing device 200 may include a plurality of mounting holes 202a-202f. A metal bracket 204 may be attached to a backside of computing device 200 to engage attachment feature 108. Thus, attachment feature 108 may enable device stand 100 to be securely coupled to computing device 200.

During operation, device stand 100 may be coupled to the backside of computing device 200 to define a reclining angle of computing device 200 via the set of mounting tabs 112a-112d. To define a first reclining angle of computing device 200, device stand 100 may be plugged into a first set of mounting holes of computing device 200 via the set of mounting tabs 112a-112d. To define a second reclining angle of computing device 200, device stand 100 may be plugged into a second set of mounting holes of computing device 200 via the set of mounting tabs 112a-112d. For example, the first set of mounting holes may correspond to mounting holes 202c-202f. The second set of mounting holes may correspond to mounting holes 202a-202d. To further define the reclining angle of computing device 200, the orientation of device stand 100 may be adjusted before plugging into the backside of computing device 200, as described in more detail in FIGS. 2B-2D.

Figure 2D:
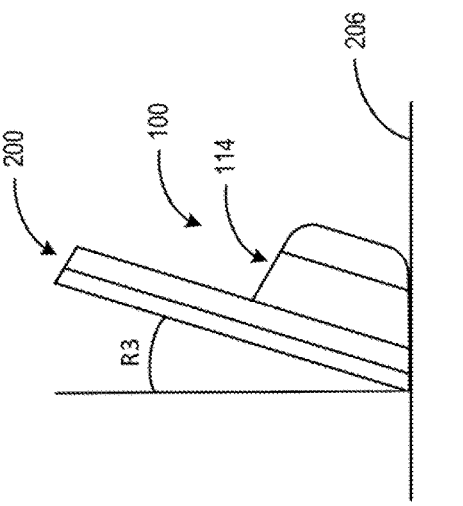
FIG. 2D illustrates a side view of a computing device having a third reclining angle when coupled to the device stand of FIG. 1A, according to an example.
Figure 2C:
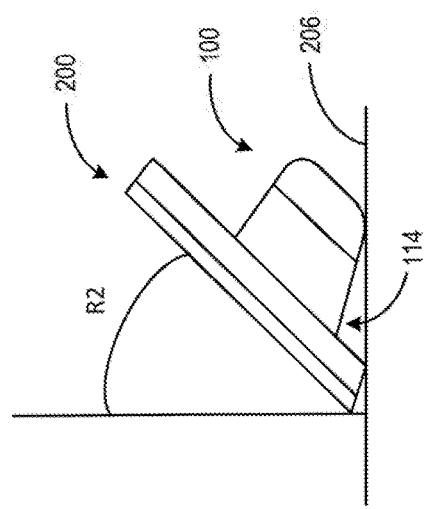
FIG. 2C illustrates a side view of a computing device having a second reclining angle when coupled to the device stand of FIG. 1A, according to an example.
Figure 2B:
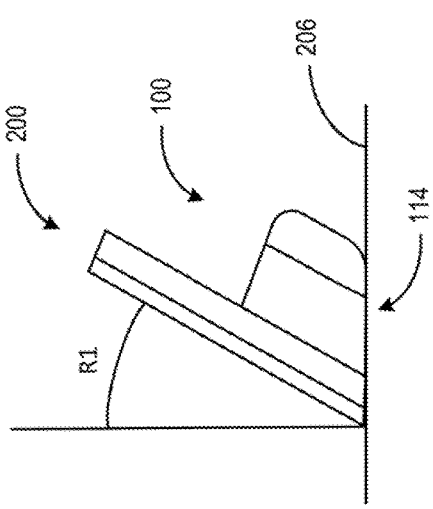
FIG. 2B illustrates a side view of a computing device having a first reclining angle when coupled to the device stand of FIG. 1A, according to an example.

FIG. 2B illustrates a side view of computing device 200 having a first reclining angle when coupled to device stand 100, according to an example. In FIG. 2B, device stand 100 and computing device 200 may be resting on a surface 206. Device stand 100 may be plugged into the first set of mounting holes (e.g., mounting holes 202c-202f). Device stand 100 may be in a first orientation (e.g., first sidewall 114 is facing towards surface 206). Computing device 200 may have a first reclining angle R1 as defined by the first set of mounting holes device stand 100 is plugged into and the first orientation of device stand 100.

In FIG. 2C, device stand 100 is still in the first orientation, but is plugged into the second set of mounting holes (e.g., mounting holes 202a-202d). Computing device 200 may have a second reclining angle R2 as defined by the second set of mounting holes device stand 100 is plugged into and the first orientation of device stand 100. Second reclining angle R2 may be greater than first reclining angle R1.

In FIG. 2D, device stand 100 may be plugged into the first set of mounting holes. Device stand 100 may be in a second orientation (e.g., first sidewall 114 is facing away from surface 206) that is different than the first orientation. Computing device 200 may have a third reclining angle R3 as defined by the first set of mounting holes device stand 100 is plugged into and the second orientation of device stand 100. Third reclining angle R3 may be different from reclining angles R1 and R2.

As illustrated in FIGS. 2B-2D, by selecting a set of mounting holes that device stand 100 is plugged into and an orientation of device stand 100 when device stand 100 is coupled to computing device 200, a plurality of different reclining angles of computing device 200 may be defined. To uncouple device stand 100 from computing device 200, first member 102 of device stand 100 may be rotated with respect with second member 104 of device stand 100 so that attachment feature 108 may be disengaged from metal bracket 204, as described in more detail in FIGS. 3A-4C.

FIG. 3A illustrates a perspective view of first member 102 of device stand 100 of FIG. 1A, according to an example. First member 102 may include a base region 302, a body region 304 that extends from edges of base region 302. First member 102 may further include an attachment tab 306, attachment feature 108, a set of rotation tabs 308a-308b, and a set of connection tabs 310a-310b.

Attachment tab may extend from base region 302 and may be coupled to attachment feature 108 (e.g., via a screw). The set of rotation tabs 308a-308b may enable first member 102 to rotate with respect to second member 104 so that device stand 100 may decouple from computing device 200. The set of connection tabs 210a-210b may enable first member 102 to be coupled to third member 106.

FIG. 3B illustrates a perspective view of second member 104 of device stand 100 of FIG. 1A, according to an example. Second member 104 may include a body region 312 that defines the shape of second member 104. Second member 104 may also include a second opening 314 to receive attachment tab 306 and the set of connection tabs 310a-310b. Second member 104 may further include a set of rotation tracks 316a-316b to enable first member 102 to rotate with respect to second member 104 via the set of rotation tabs 308a-308b, as described in more detail in FIGS. 4A-4C. As an example, rotation tab 308a may move along rotation track 316a and rotation tab 308b may move along rotation track 316b when first member 102 is rotating with respect to second member 104.

Figure 4A:
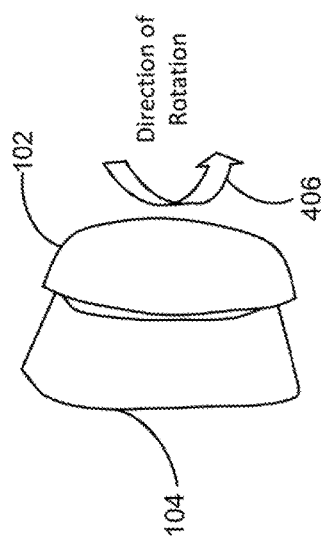
FIGS. 4A-4C illustrate a rotation of the first member of the device stand of FIG. 1A with respect to the second member of the device stand, according to an example.
Figure 4C:
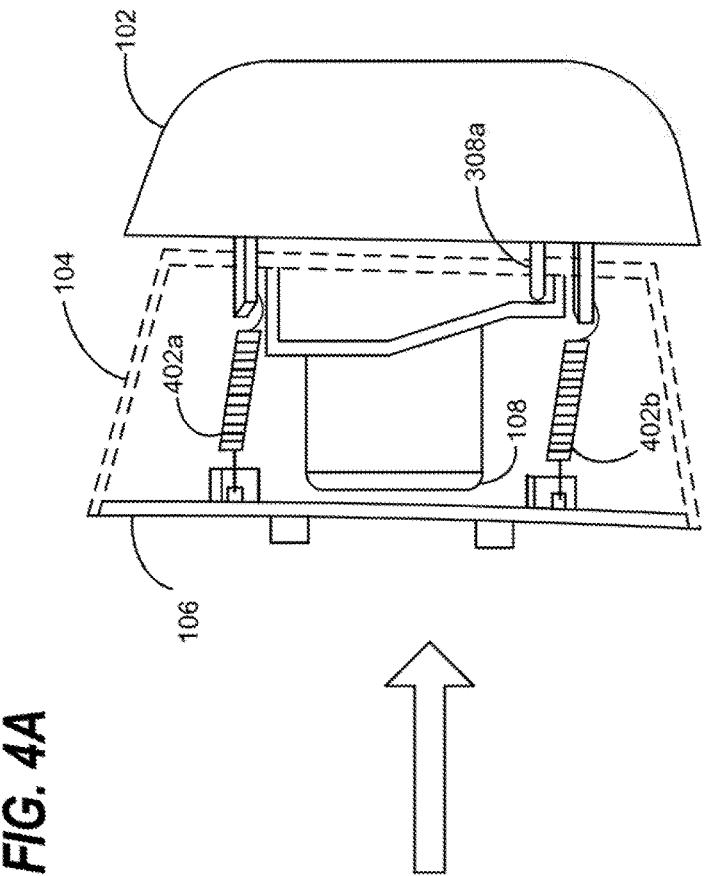
Figure 4B:
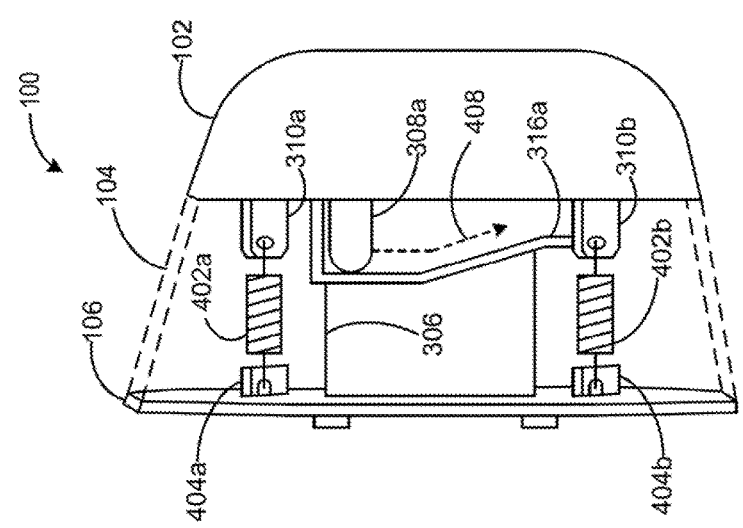

FIGS. 4A-4C illustrate a rotation of first member 102 of device stand 100 of FIG. 1A with respect to second member 104 of device stand 100, according to an example. Turning to FIG. 4A, first member 102 may rotate relative to second member 104 from a first position to a second position (as shown in an arrow 406) to disengage attachment feature 108 from metal bracket 204. First member 102 may rotate in the opposite direction to change from the second position back to the first position so that attachment feature 108 may engage metal bracket 204. The first position and the second position are described in more detail in FIGS. 4B and 4C, respectively.

Turn to FIG. 4B, first member 102 may be in the first position relative to second member 104 (shown in dotted lines). In the first position, attachment feature 108 may be encompassed by opening 110 as described in FIG. 1A. First member 102 may be coupled to third member 106 via a set of biasing members 402a-402b. Each biasing member 402a-402b may provide a biasing force to pull first member 102 towards third member 106. Each biasing member 402a-402b may be any elastic mechanical device that pulls first member 102 towards third member 106. In an example, each biasing member 402a-402b may be implemented as a coil spring. Each biasing member 402a-402b may be coupled corresponding connection tabs of first member 102 and third member 106. For example, biasing member 402a may be coupled to connection tab 310a of first member 102 and a connection tab 404a of third member 106. Biasing member 402b may be coupled to connection tab 310b of first member 102 and a connection tab 404b of third member 106.

When first member 102 is rotating with respect to second member 104 to change from the first position to the second position, each rotation tab 308a-308b of first member 102 may move along a corresponding rotation track of second member 104. As an example, rotation tab 308a may move along rotation track 316a in a first direction as indicated by an arrow 408. Rotation tab 308a may be curved so that first member 102 may move away from third member 106 after rotating from the first position to the second position. Rotation tab 308b may move along rotation track 316b in a second direction opposite to the first direction. Rotation track 316b may also be curved, but in a mirrored fashion relative to rotation track 316a so that first member 102 may move away from third member 106 evenly.

Turning to FIG. 4C, first member 102 may be in the second position after the rotation. In the second position, attachment feature 108 may be outside of first opening 110. Also, biasing member 402a-402b may be stretched and may apply a biasing force to pull first member 102 towards third member 106. Thus, the biasing force may facilitate first member 102 to change from the second position back to the first position.

The use of "comprising", "including" or "having" are synonymous and variations thereof herein are meant to be inclusive or open-ended and do not exclude additional unrecited elements or method steps.

What is claimed is:

1. A device stand comprising:
   a first member including an attachment feature to couple the device stand to a computing device;
   a second member including a rotation track to enable the first member to rotate with respect to the second member to decouple the device stand from the device;
   a third member including an opening to receive the attachment feature, wherein the second member is situated between the first member and the third member, wherein the attachment feature is a magnet;
   a first sidewall having a first slope;
   a second sidewall having a second slope that is different from the first slope, wherein the first sidewall and the second sidewall are defined by the first member and the second member;
   a base region; and
   a rotation tab extending from the base region, wherein the rotation tab is to move along the rotation track to enable the first member to rotate with respect to the second member.

2. The device stand of claim 1, wherein the first member further includes:
   an attachment tab extending from the base region, wherein the attachment feature is coupled to the attachment tab.

3. The device stand of claim 2, wherein the second member further includes a second opening to receive the attachment tab.

4. The device stand of claim 1, further comprising:
   a third sidewall having a third slope that is different from the second slope; and
   a fourth sidewall having a fourth slope that is different from the third slope, wherein the third sidewall and the fourth sidewall are defined by the first member and the second member.

5. A device stand comprising:
   a first member including an attachment feature to couple the device stand to an computing device;
   a second member including a rotation track to enable the first member to rotate with respect to the second member to decouple the device stand from the computing device:
   a third member including an opening to receive the attachment feature:
   a biasing member to couple the first member to the third member, the biasing member to provide a biasing force to pull the first member towards the third member, wherein the second member is situated between the first member and the third member;
   a first sidewall having a first slope; and
   a second sidewall having a second slope that is different from the first slope, wherein the first sidewall and the second sidewall are defined by the first member and the second member.

6. The device stand of claim 5, wherein the first member further includes:
   a base region;
   an attachment tab extending from the base region, wherein the attachment feature is coupled to the attachment tab; and
   a rotation tab extending from the base region, wherein the rotation tab is to move along the rotation track to enable the first member to rotate with respect to the second member.

7. The device stand of claim 6, wherein the second member further includes a second opening to receive the attachment tab.

8. The device stand of claim 5, wherein the attachment feature is a magnet.

9. An apparatus comprising:
   a computing device including a set of mounting holes;
   a metal bracket coupled to the computing device; and
   a device stand including:
   a first member including an attachment feature to couple the device stand to the computing device via the metal bracket;
   a second member including a rotation track to enable the first member to rotate with respect to the second member to decouple the device stand from the computing device;
   a third member including a set of mounting tabs to engage the set of mounting holes to define a reclining angle of the computing device;
   a first sidewall having a first slope; and
   a second sidewall having a second slope that is different from the first slope, wherein the first sidewall and the second sidewall are defined by the first member and the second member.

10. The apparatus of claim 9, wherein the computing device further includes a second set of mounting holes, wherein the computing device is to have a first reclining angle when the device stand is coupled to the computing device is via the set of mounting holes, and wherein the computing device is to have a second reclining angle when the device stand is coupled to the computing device is via the second set of mounting holes.

11. The apparatus of claim 9, wherein the first member further includes:
    a base region;
    an attachment tab extending from the base region, wherein the attachment feature is coupled to the attachment tab; and
    a rotation tab extending from the base region, wherein the rotation tab is to move along the rotation track to enable the first member to rotate with respect to the second member.

12. The apparatus of claim 11, wherein the second member further includes a second opening to receive the attachment tab.

13. The apparatus of claim 9, wherein the attachment feature is a magnet.

14. The apparatus of claim 9, wherein the reclining angle is further defined by the first sidewall or the second sidewall.

* * * * *